United States Patent Office 2,926,264
Patented Feb. 23, 1960

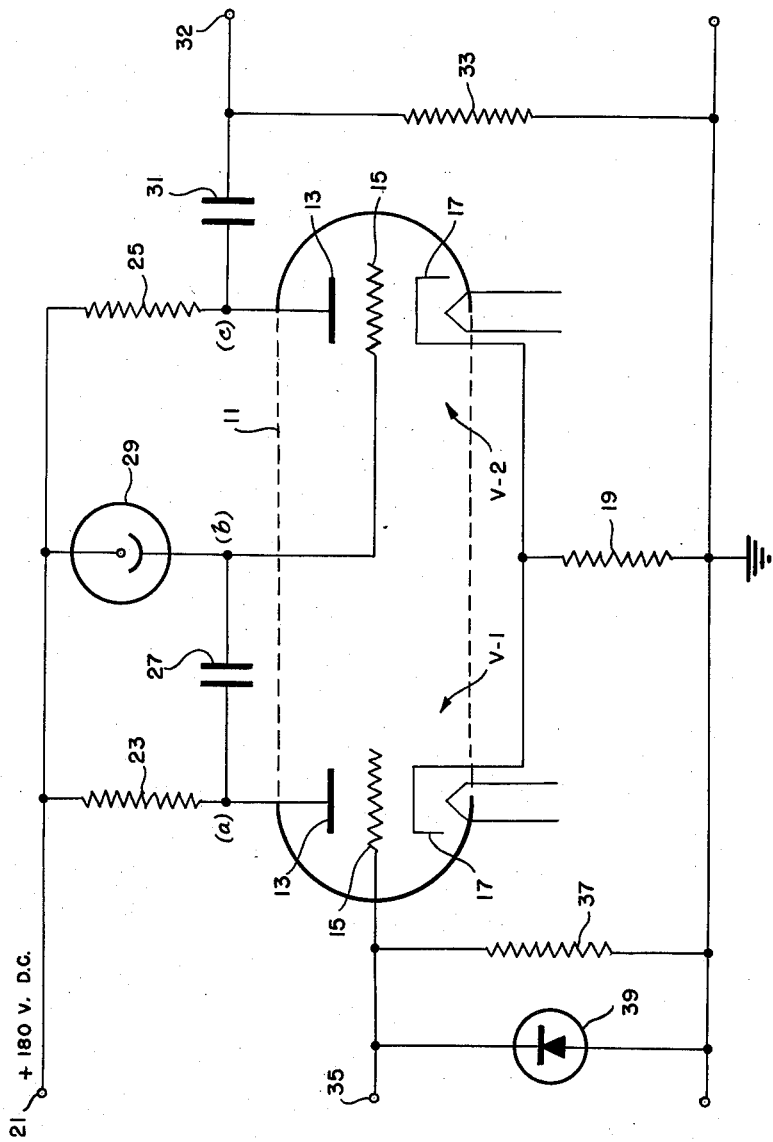

2,926,264

LIGHT SENSITIVE SYSTEM

James P. Fitzpatrick, Palo Alto, Calif., assignor to General Electric Company, a corporation of New York Application September 10, 1956, Serial No. 608,957

10 Claims. (Cl. 250—214)

The present invention relates in general to photosensitivity and has more particular reference to means for controlling an operable device in response to impinging or applied light rays, the invention being specifically concerned with a photosensitive electronic control system, especially well suited to initiate and terminate the operation of a controllable device, such as the shutter of a camera, in response to selected change in the amount of light prevailing or applied at a selected location.

While control systems embodying the present invention are particularly well suited for application in controlling the exposure mechanism of cameras used in aerial reconnaissance photography, especially at night, it will be obvious that the invention is not necessarily limited to aerial photography or to the control of the exposure mechanism of cameras, but that the invention may be usefully applied wherever the operation of a controllable load device is to be regulated in accordance with changes in applied light.

Nocturnal aerial photography may be accomplished by first adequately illuminating the terrain or other object to be pictured, as by setting in operation a light producing device, such as a magnesium flare, in the vicinity of the subject matter to be pictured, and by then opening the exposure mechanism of a picturing camera during a selected exposure interval, preferably while the subject matter to be pictured is exposed to optimum illumination. To this end, it is desirable to cause the exposure mechanism of the camera to open when the illumination of the object to be pictured reaches a desired or optimum level, and thereafter to cause the exposure mechanism to close, and thus terminate the exposure at the conclusion of an interval of duration such as to accomplish optimum exposure of light sensitive picturing medium or film, in the picturing camera, under prevailing light conditions.

An important object of the present invention is to provide a light sensitive electronic system adapted to initiate operation of a controlled load device, such as the exposure mechanism of a camera, and to disable or terminate the operation of the load device at the conclusion of an interval of duration proportional to the quantity of light applied during such interval.

Another important object is to provide an electronic translation system adapted to be controllingly connected with an operable load device and normally held inactive, including means to initiate operation of the load device in response to application of light upon the sensitive system at a predetermined intensity, and means for discontinuing the operation of the load device at the conclusion of an interval proportional to the quantity of light applied on the sensitive system during the interval.

Another important object is to provide an electronic translation system controllingly connected with a condenser associated with a photosensitive device or element, whereby the condenser may be progressively charged in proportion to the quantity of light applied on the light sensitive device, the condenser being connected to disable the system when electrically charged to a selected level.

Another important object of the invention is to provide a timing system of the character mentioned comprising a pair of electron flow valves interconnected to form a cathode-coupled, monostable, multi-vibrator in which one of the valves is operable to initiate the timing cycle of the system, while the other valve is controllingly connected with a timing condenser and an interconnected photosensitive device operable to disable the system when the electrical charge on the condenser reaches a value corresponding with the application of a desired quantity of light upon the sensitive device, following the activation of the system, for the performance of its operating cycle.

The foregoing and numerous other important objects, advantages and inherent functions of the invention will become apparent as the same is more fully understood from the following description, which, taken in connection with the accompanying drawing, discloses a preferred embodiment of the invention.

Referring to the drawing:

The single figure of the drawing is a diagram of electrical components and circuitry forming an electronic system embodying the present invention.

To illustrate the invention, the drawing shows an electrical translation system S embodying a pair of electron flow valves V-1 and V-2, which may conveniently comprise each one-half of a double electron tube 11. Each of the valves V-1 and V-2 may embody an anode or plate element 13, a control grid 15 and a cathode 17.

The cathodes 17 of the valves may be electrically interconnected and grounded through a resistor 19 having a resistance value of the order of 10,000 ohms. The anodes 13 of the valves may be electrically connected with a suitable source 21 of unidirectional electrical potential having a positive value of the order of 180 volts. The anode of the valve V-1 may be connected with the source 21 through a resistor 23 having a value of the order of 500,000 ohms, while the anode of the valve V-2 may be connected with the potential source 21 through a resistor 25 having a value of the order of 100,000 ohms.

The source-remote, anode-connected end of the resistor 23 may be connected, as at (a), with one side of a condenser 27. The control grid of the valve V-2 may be electrically connected, as at (b), with the opposite side of said condenser 27, and also with one side of a high impedance photosensitive device or element 29, the opposite side of which is connected with the electrical potential source 21.

The source-remote, anode-connected end of the resistor 25 may be electrically connected, as at (c), with one side of a condenser 31, the opposite side of which is connected with an output terminal 32, and also to ground through a resistor 33. The control grid 15 of the valve V-1 may be connected with an input terminal 35, and also to ground through a resistor 37, a diode 39 being interconnected in parallel with the resistor 37 between the grid of the valve V-1 and ground.

It will be seen from the foregoing that the system S comprises a cathode-coupled, monostable, multi-vibrator arrangement in which the cycling period of the system is controlled by the photosensitive device 29, so that said period is a proportional function of the quantity of light applied upon the light sensitive device 29 during the operating cycle of the system. Under normal or standby conditions, the valve V-2 may be maintained in conducting condition, the valve V-1 being held in cutoff, inactive or non-conducting condition. The capacitive nature of the coupling system, together with the high impedance of the photosensitive device 29, permits the grid 15 of the valve V-2 to adjust itself to the cathode potential of said valve, thereby allowing the valve to remain in conductive condition. The cathode bias on the valve V-2 will also appear between the grid and cathode of the valve V-1 as a cutoff bias to hold said valve V-1 in inactive condition.

The timing cycle of the system may be initiated by applying a positive pulsation, at a potential of the order of ten volts, between ground and the input terminal 35. Such pulsation may be applied either by means of a manually controlled switch, or under the control of suitable photosensitive switching means adapted to apply the voltage pulsation in response to the application of light at selected intensity upon the photosensitive switching means. Upon application of such positive voltage pulsation upon the control grid of the valve V-1, said valve will become conducting, thereby lowering the potential at (a) and thereafter holding it at a relatively low level.

The potential at (b) initially will be correspondingly reduced to a relatively low level, but thereafter will be progressively increased, by the action of the photosensitive device 29, as a function of the quantity of light applied on the device 29. When the potential at (b) is thus initially reduced to a relatively low level, the valve V-2 will be cut off, and will become inactive and non-conducting. As a consequence, the potential at (c) will correspondingly increase, thereby causing a positive pulse with respect to ground to appear at the output terminal 32, in position to be applied as a starting impulse upon any load device, such as the shutter mechanism of an aerial camera, that may be controllably connected with the output terminal 32.

The continued application or impingement of light upon the photosensitive device 29 will cause it to supply charging current to the condenser 27 in an amount corresponding with the quantity of light so impinging upon the device 29. As a consequence, the potential at (b) will progressively increase until the valve V-2 again reaches conducting condition, thereby ending the operating cycle of the system. Accordingly, the operation of such load device as may be controllingly connected with the output terminal 32 may be terminated in response to a negative voltage pulse delivered at said output terminal as and when the valve V-2 becomes conductive.

The system thus operates by producing two successive voltage pulses separated in time by an interval proportional to the total quantity of light applied to the sensitive device 29, during such interval, such pulses being suitable for controlling an operable load device, such as the exposure shutter of an aerial camera, the initial pulse serving to initiate the operation of the load device, while the final pulse may be applied to disable or discontinue operation of the load device, thereby correctly exposing camera film where the controlled load device is the exposure shutter of a camera containing the film.

The diode 39 is provided for the purpose of stabilizing the system against any negative pulsations as may be applied at the input terminal 35, which pulsations might alter the cycling time of the system. The resistor 37 functions as a ballast to stabilize the input resistance of the circuit against the reverse resistance characteristics of the diode 39. Where the tube 11 is a dual triode comprising both valves V-1 and V-2, it may be desirable to control filament excitation in order to stabilize the grid characteristics of the valves, and hence the timing characteristics of the system. The resistance values of the anode resistors 23 and 25 should be selected in the approximate ratio of 5-1, while the other circuit values may be selected in accordance with the desired timing characteristics to be provided.

It will be seen from the foregoing that the system functions to produce a potential at (b) which, at first, decreases below the cut off voltage of the valve V-2, and then increases linearly until valve V-2 is returned to its normal conducting condition. This linear characteristic renders the timing cycle of the system exceedingly reliable, because the slope of the rising voltage is uniform and substantially steeper than that provided by timing controls operable in accordance with an exponential response characteristic.

It is thought that the invention and its numerous attendant advantages will be fully understood from the foregoing description, and it is obvious that numerous changes may be made in the form, construction and arrangement of the several parts without departing from the spirit and scope of the invention, or sacrificing any of its attendant advantages, the forms herein disclosed being a preferred embodiment for the purpose of illustrating the invention.

The invention is hereby claimed as follows:

1. A photosensitive control system comprising a pair of electron flow devices, means for normally maintaining one of said devices in conductive and the other in cutoff condition, means operable to render the normally cutoff device conductive while simultaneously rendering the normally conductive device inactive, to thereby apply a starting control impulse of desired character at the output of said system, an integrating condenser connected in said system, and photosensitive means for progressively charging the condenser to a potential level at which the normally conductive flow device may regain its conductive condition, after being cut off, to thereby deliver a terminal control impulse of desired character at the output terminal of said system, after a desired amount of light has been applied on the photosensitive device following the initiation of the operating cycle of the system.

2. A photosensitive control system comprising a pair of electron flow devices, having electrically interconnected cathodes, means for applying selected potential on the anodes of said flow devices in manner normally maintaining one in conductive and the other in cutoff condition, means for applying a potential pulsation upon the control grid of the normally cut off device to render the same conductive, a condenser connected between the anode of said normally cut off device and the control grid of the normally conductive device, whereby to simultaneously render said normally conductive device inactive and thereby apply a starting control impulse of desired character at the output of said system, photosensitive means operable to progressively charge the condenser to a potential level at which the normally conductive flow device may regain its conductive condition, after being cut off, to thereby deliver a terminal control impulse of desired character at the output terminal of said system, after a desired amount of light has been applied on the photosensitive device following the initiation of the operating cycle of the system.

3. A photosensitive control system as set forth in claim 2, wherein resistors of unlike value are connected in the anode circuits of said flow devices.

4. A photosensitive control system as set forth in claim 2, wherein an output condenser is connected between the output terminal and the anode of the normally conductive flow device.

5. A photosensitive control system as set forth in claim 2, wherein a rectifying diode is connected to the control grid of the normally cut off flow device, to aid in the application of a potential pulsation thereon.

6. A photosensitive control system as set forth in claim 2, wherein a rectifying diode and resistor, in parallel therewith, are connected to the control grid of the normally cut off flow device, to aid in the application of a potential pulsation thereon.

7. A photosensitive control system comprising a pair of electron flow devices, each having an anode, a cathode and a control grid, the cathodes of said devices being interconnected and connected to ground through a resistor, means for connecting the anodes of said devices with the ground remote side of an electrical potential source, through anode resistors of unlike value, whereby to normally maintain one of them in conductive and the other in cutoff condition, a condenser interconnected between the anode of the normally cut off device and the control grid of the normally conductive device, means to apply a potential pulsation on the control grid of the normally cut off device to render the same conductive, while simultaneously rendering the normally conductive device inactive, to thereby apply a starting control impulse of desired character at the output of said system, and photosensitive means connected with said condenser for progressively charging the same to a potential level at which the normally conductive flow device may regain its conductive condition, after being cut off, to thereby deliver a terminal control impulse of desired character at the output terminal of said system, after a desired amount of light has been applied on the photosensitive device following the initiation of the operating cycle of the system.

8. A photosensitive control system for actuating camera shutters comprising the combination, with an electrically operable shutter actuating device adapted for connection as a load on said system, of a pair of electron flow devices, means for maintaining one of said devices in conductive and the other in cutoff condition, means operable to render the normally cutoff device conductive while simultaneously rendering the normally conductive device inactive, to thereby apply a shutter tripping impulse of desired character upon the shutter actuating device at the output of said system, an integrating condenser connected in said system, and photosensitive means operable to progressively charge the condenser to a potential level at which the normally conductive flow device may regain its conductive condition, after being cut off, to thereby deliver a shutter closing impulse upon the shutter actuating device at the output of said system after a desired amount of light corresponding with the charged condition of said integrating condenser has been applied on the photosensitive device following the application of said shutter tripping impulse.

9. A photosensitive control system for actuating camera shutters comprising the combination, with an electrically operable shutter actuating device adapted for connection as a load on said system, of a pair of electron flow devices each embodying an anode, a cathode and a control element, the cathodes of said devices being connected to ground, means for connecting the anodes of said devices with the ground remote side of an electrical potential source, through anode resistors of unlike value, whereby to normally maintain one of said devices in conductive and the other in cutoff condition, an integrating condenser connected between the anode of the normally cutoff device and the control element of the normally conductive device, means to apply a potential pulsation upon the control element of the normally cutoff device to render the same conductive, while simultaneously rendering the normally conductive device inactive, to thereby apply a shutter tripping impulse of desired character upon said shutter actuating device at the output of said system, and a photoconductive element connected between an electrical power source and said integrating condenser to progressively charge the same to a potential at which the normally conductive flow device may regain its conductive condition, after being cut off, to thereby deliver a shutter closing impulse of desired character upon the shutter actuating device at the output of said system, after a desired amount of light has been applied upon the photoconductive element following application of the potential pulsation on the control element of the normally cutoff device.

10. A photosensitive control system as set forth in claim 9, wherein the anode of the normally conductive flow device is connected with the system output through a condenser, while the control element of the normally inactive flow device is connected to ground through a rectifier and a ballast resistor in parallel therewith.

References Cited in the file of this patent

UNITED STATES PATENTS

| | | |
|---|---|---|
| 1,229,740 | Furstenau | June 12, 1917 |
| 2,050,737 | Schriever | Aug. 11, 1936 |
| 2,156,440 | Veber | May 2, 1939 |
| 2,252,457 | Cockrell | Aug. 12, 1941 |
| 2,450,288 | Maisch | Sept. 28, 1948 |
| 2,589,240 | Frye | Mar. 18, 1952 |
| 2,802,107 | Arnold | Aug. 6, 1957 |

OTHER REFERENCES

Principles of Radar, by the M.I.T. Radar School Staff, Second edition, McGraw Hill Book Company, New York, 1946, pp. 2–53 to 2–56, catalogue No. TK 6575.M3.